United States Patent Office 2,788,335
Patented Apr. 9, 1957

2,788,335
CELLULAR REACTION PRODUCTS OF CASTOR OIL, AN EPOXY RESIN, AND AN AROMATIC DIISOCYANATE

Eric Barthel, Jr., New Castle, Del., assignor to E. I. du Pont de Nemours and Company, Wilmington, Del., a corporation of Delaware No Drawing. Application July 20, 1953,
Serial No. 369,240

5 Claims. (Cl. 260—2.5)

This invention relates to cellular plastic material, and more particularly to an improved cellular plastic material

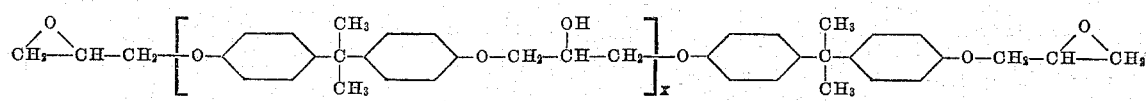

produced by the condensation of the reaction product of castor oil, an epoxy resin and an aromatic diisocyanate.

A number of cellular plastic materials have been produced as well as described in literature, but in general these cellular plastic materials, which are to be distinguished from the cellular elastomeric materials, are lacking in many important properties. In the main they are brittle and readily damaged by compression and flexing, and, where the products are the type which are blown in the positions they are to occupy as distinguished from preformed plastic foams, there is a shrinkage which in many cases is disadvantageous, particularly where the foam is used to fill cavities and give increased structural strength.

It is an object of this invention to provide cellular plastic materials which have a uniform and small celled structure and which show good resistance to breaking due to flexing, compression, and exhibit improved resistance to shrinking. A further object of the invention is to provide cellular plastic materials of low apparent density but which have high heat insulation value. A still further object of the invention is to provide cellular plastic material which can readily be formed in the place where it is to be used and need not be premolded.

The cellular plastic materials of this invention are prepared from the condensation product resulting from the reaction of castor oil with an epoxy-containing resin in the presence of an acidic or basic catalyst. This castor oil-epoxy resin condensation product is then reacted with an organic diisocyanate to produce a stable condensation polymer which for convenience will be referred to in this description as the "prepolymer." The prepolymer, which is a thick, syrupy liquid, is reacted with water to produce the plastic foam. The water reacts with unreacted isocyanate groups in the prepolymer to cause what is generally considered to be a chain extension of the polymer with the liberation of carbon dioxide which due to the consistency of the prepolymer, operates as a blowing agent to produce the plastic foam. This foam is self-curable on standing.

In carrying out the first step of the process, the castor oil is first heated somewhat above the melting point of the epoxide containing resin, the epoxy resin then added and the mixture stirred until a homogeneous mass is obtained. The temperature is then raised to about 160° C. and a small amount of the catalyst added. After additional stirring until the reaction is complete, the reaction mixture is cooled and filtered to remove a small amount of solid material. In this reaction the epoxy resin reacts its terminal epoxide group with the hydroxyl groups in the castor oil to yield a new resin which contains a plurality of hydroxyl groups.

The epoxy containing resins used in this reaction were prepared from the reaction of bis-phenylolpropane with epichlorohydrin. Thus they are polymeric compounds containing hydroxyl groups and terminal epoxide groups and have the following structure:

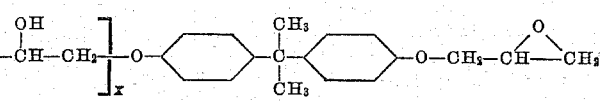

Compounds of this type are sold by the Shell Chemical Corp. under the name of "Epon" resins. While the molecular weight of these resins may vary, those used as illustrative examples in this invention have molecular weights ranging from about 350 to 4000. This molecular weight figure is based on the epoxide value of the resins used. If the epoxy resin is represented as

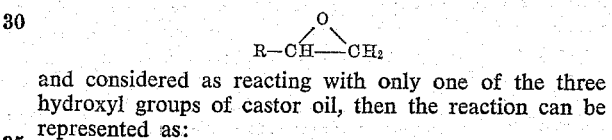

and considered as reacting with only one of the three hydroxyl groups of castor oil, then the reaction can be represented as:

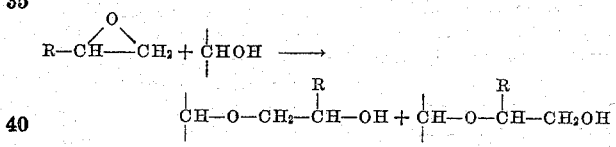

It will be observed that two isomers are probably formed. The R group of the epoxide resin may become attached to either the carbon atom alpha or beta to the ether linkage and both isomers are probably present. It will also be noted that there is no change in the number of hydroxyl groups. For each one taking part in the reaction, one is formed.

The amount of epoxide resin used per mol of castor oil may vary from about .025 mol to .5 mol. When more than about 0.5 mol of the epoxide resin per mol of castor oil is used, the resin reaction product becomes viscous and is difficult to handle. It must be understood that when the lower molecular weight epoxide containing resins are used, it is possible to use more than 0.5 mol of resin without obtaining too viscous a reaction product. The preferred epoxide resin used has a molecular weight of about 1000 and for this resin about 0.5 mol of resin per mol of castor oil is the upper limit.

The temperature at which the condensation between the castor oil and the epoxide resin is carried out is not critical. The reaction has been carried out at 90° to 100° C. for 2 hours and satisfactory foams prepared from the resin. Temperatures as high as 175° C. have been found satisfactory for this condensation. It is only necessary that the temperature be sufficiently high that the castor oil and epoxide containing resin can form a homogeneous mass prior to the addition of the catalyst required for the condensation to occur.

Acidic or basic catalysts are generally employed to effect the condensation between castor oil and the epoxide resin. The preferred catalyst is sodium or sodium methoxide, although other catalysts such as diethyl cyclohexylamine, p-toluenesulfonic acid or sulfuric acid are also satisfactory. The catalysts are of the type generally employed in the condensation of ethylene oxides or other oxides with hydroxyl containing compounds. The amount of catalyst is not critical and need only be added in small amounts of about 1 gram of catalyst per 500 g. of castor oil.

The second step of the process as already indicated consists of preparing the prepolymer. This is prepared by combining the epoxide resin-castor oil condensation product with an arylene diisocyanate. The mixture may be heated for 30 minutes on the steam bath to effect the reaction or the reactants may be allowed to stand at room temperature for about 18 hours or more. In order that the isocyanate groups react only with the hydroxyl groups in the resin and not with any other active hydrogens, it is important that the heat of the reaction does not go above 100° C. This can be controlled by external cooling if necessary. The prepolymer is preferably protected from atmospheric moisture and it is therefore desirable to carry out the reaction under an atmosphere of nitrogen or other inert gas.

If this prepolymer is allowed to stand, it will become more and more viscous which is presumed to be due to the reaction of the isocyanate groups with the hydrogens of the urethane linkages to yield substituted polymeric allophanic acid esters. This undesirable increase in viscosity can be prevented by neutralizing the residual basicity of the "Epon"-castor oil condensation product with a mineral acid or a substance which liberates a mineral acid such as benzoyl chloride, p-toluene sulfonic acid, glacial phosphoric acid or hydrogen chloride. The preferred acidic material for this purpose is dry HCl in alcohol although materials other than those listed can be used.

The arylene diisocyanates which may be employed to produce the products of this invention include a wide variety of compounds. Representative of the types that may be used are: toluene-2,4-diisocyanate, m-phenylene diisocyanate, 1-chlorophenylene-2,4-diisocyanate, xenylene-4,4'-diisocyanate and naphthalene-1,5-diisocyanate. In general, the diisocyanates of the benzene and naphthalene series or mixtures of these compounds may be employed.

It has been found that about 1.2 to 1.9 mols of the organic diisocyanate per equivalent of hydroxyl group in the castor oil-epoxide containing condensation product may be used. When less than 1.2 mols of isocyanate are used the viscosity of the prepolymer is so high that it cannot be handled readily. On the other hand, when the amount of arylene diisocyanate is greater than 1.9 mols per mol of equivalent hydroxy group in the previously prepared resin, the plastic foam produced from such prepolymer is brittle and less desirable. This results because the large number of free isocyanate groups permits a more violent reaction when the prepolymer is foamed and the carbon dioxide generated is not trapped, giving poor cell structure. By using substantially the proportions of arylene diisocyanate indicated, a prepolymer is obtained having a viscosity within the range of from about 750 to 75,000 centipoises at 30° C. At these viscosities the carbon dioxide which is evolved does not escape from the mass to any extent and still the mass is capable of being properly blown into a cellular form. If the viscosities are too low, the carbon dioxide would merely bubble out and escape, while at too high a viscosity satisfactory mixing cannot be obtained and non-uniform cellular products of higher density result.

The foamed plastics which are obtained in the final step of this process are prepared by adding water and catalyst to the prepolymer. The amount of water which is added should be sufficient to react with the free isocyanate groups remaining after the preparation of the prepolymer but preferably not in too large an excess. When less than about 0.5 mol of water for each equivalent of free isocyanate group theoretically remaining in the prepolymer is used, insufficient gas will be generated and the resulting foam is not as satisfactory as when more water is used. If more than about 1.5 mols of water per isocyanate group theoretically remaining unreacted in the prepolymer is used, the reaction rate will be so rapid that the process will be difficult to handle. When more water is added than is necessary for the reaction with the diisocyanate groups, the excess water will temporarily remain in the foam and act somewhat as a plasticizer and therefore the use of too large an excess is not desirable. Also of significance is that if an insufficient amount of water is added to react with the free isocyanate groups in the prepolymer, then these isocyanate groups are free to react with other active hydrogens in the resin such as the hydrogens on the substituted urea groups which will then cross-link and tend to give a more rigid sponge. The theoretical amount of water required for each isocyanate group is of course ½ mol since the reaction of water with two diisocyanate groups results in the formation of a substituted urea with the liberation of carbon dioxide which acts as the foaming gas.

It is frequently desirable to use a dispersing agent in the water as it is mixed with the prepolymer. Usually from 0.5% to 1.0% of dispersing agent is sufficient. However, some of the higher molecular weight compounds mentioned below which assist in forming the dispersion also operate as modifiers of the resulting plastic material and therefore may be used in larger amounts. Among the dispersing agents which have been found to be satisfactory are: sodium carboxymethylcellulose, lignin sulfonates, lauric acid ester of triethanolamine, gelatin, diethylcyclohexylamine salt of alkyl sulfates containing from 12 to 16 carbon atoms, and the polyalkylene oxide glycols such as polyethylene oxide glycol or polypropylene oxide glycol, or mixtures of the two.

Additives such as fillers, extenders, modifiers, etc., may also be incorporated into the material to give various effects to the sponge structure. Generally speaking, these materials give more rigid, more brittle and more dense products. Consequently, when they are used they are added in minor amounts. Such products include magnesium carbonate, powdered wood cellulose, bentonite, silicon dioxide, calcium silicate, carbon black, glass fiber, magnesium stearate, methylene distearamide, etc. Magnesium stearate appears to cause somewhat larger cell structure and somewhat thicker cell walls. Aluminum stearate as an additive aids in the formation of small uniform unconnected cell structures. These cellular materials have insulating properties similar to commercially available insulating materials but are generally much lighter and consequently offer a considerable saving where weight is of particular importance. As will be seen from the examples, it is quite possible to apply this type of insulation to various pieces of equipment, pipe, etc., with a minimum amount of labor. For example, a simple cardboard mold may be built around the pipe and the plastic material can be poured into the mold. It foams up inside the mold and cures in place. The cardboard mold may then be stripped off and the insulation can be left as is or can be painted.

The material may also be used to furnish insulation inside a formed body. For example, a refrigerator door consists of an inner and outer side. The freshly mixed mass may be poured into such a compartment and permitted to foam up, thereby filling the cavity. Obviously these cellular plastics may be molded in any desired shape or readily cut into desired shapes from preformed blocks or sheets. This foam has an advantage over the foams of the prior art in that it is much more resilient and less apt to break on compression and on flexing.

The following examples are given to illustrate the invention. The parts used are by weight, unless otherwise specified.

PREPARATION OF EPOXY RESIN-CASTOR OIL CONDENSATE

Example 1

500 grams (0.5 mol) of castor oil having a hydroxyl number of 161.5 are heated to 100°–110° C. (about 30° C. above the melting point of the resin). 50 g. (.049 mol) of an epoxide containing resin whose approximate molecular weight is 1026 ("Epon 1001") is added and the mixture stirred until the epoxy resin is melted and dispersed throughout the castor oil. The temperature is then raised to 160°±5° C. and 1 g. of sodium methoxide is added as catalyst. After stirring for 30 minutes, a small sample cooled to room temperature is clear.

The reaction is probably finished at this time, but stirring is continued at 160°±5° C. for a total time of 2 hours. The reaction is cooled and filtered through two layers of cheese cloth to remove a small amount of solid material. The filtered product was analyzed and has a hydroxyl number of 170.5 and an acid number of 0.62.

In addition to the reaction product described in Example 1, the following condensations between castor oil and an epoxy resin were carried out by a similar procedure.

Example 2

10 g. (.0025 mol) of epoxy resin ("Epon 1007"). Approximate M. W.=4000
100 g. (0.1 mol) castor oil (hydroxyl No. 161.5)
0.2 g. NaOCH$_3$ catalyst
Temperature: 170°±5° C. Time of reaction: 8 hours
Hydroxyl No. of condensation product=166
Equivalents of OH per 100 g. of product=0.30

Example 3

19.2 g. (0.05 mol) epoxy resin ("Epon 828"). Approximate M. W.=384
100 g. (0.1 mol) castor oil (hydroxyl No. 161.5)
0.2 g. NaOCH$_3$ catalyst
Temperature: 165°±5° C. Time of reaction: 20 hours
Hydroxyl No. of product=151
Equivalents of OH per 100 g. of product=0.27

Example 4

30 g. (0.03 mol) epoxy resin ("Epon 1001"). Approximate M. W.=1026
100 g. (0.1 mol) castor oil (hydroxyl No. 161.5)
0.2 g. NaOCH$_3$ catalyst
Temperature: 170°±5° C. Time of reaction: 8 hours
Hydroxyl No. of product=166
Equivalents of OH per 100 g. of product=0.30

Example 5

10 g. (0.01 mol) epoxy resin ("Epon 1001")
100 g. (0.1 mol) castor oil (hydroxyl No. 161.5)
0.04 g. sodium catalyst
Temperature: 160°±5° C. Time of reaction: 20 hours
Hydroxyl No. of product=170
Equivalents of OH per 100 g. of product=0.30

Example 6

10 g. (0.01 mol) epoxy resin ("Epon 1001")
100 g. (0.1 mol) castor oil (hydroxyl No. 161.5)
0.2 g. diethylcyclohexylamine catalyst
Temperature: 160°±5° C. Time of reaction: 20 hours
Hydroxyl No. of product=178
Equivalents of OH per 100 g. of product=0.32

Example 7

10 g. (0.01 mol) epoxy resin ("Epon 1001")
100 g. (0.1 mol) castor oil (hydroxyl No. 161.5)
0.2 g. NaOCH$_3$ catalyst
Temperature: 160°±5° C. Time of reaction: 17 hours
Hydroxyl No. of product=168
Equivalents of OH per 100 g. of product=0.30

Example 8

500 g. (0.5 mol) castor oil (hydroxyl No. 147)
50 g. (0.05 mol) epoxy resin ("Epon 1001")
2 ml. of 95% H$_2$SO$_4$
Temperature: 155° C. Time of reaction: 15 minutes
Hydroxyl No. of product=145
Equivalents of OH per 100 g. of product=0.26

PREPARATION OF PREPOLYMERS

The prepolymers are formed by slowly adding the hydroxy containing epoxy resin-castor oil condensation product to the arylene diisocyanate with stirring, heating to about from 70° to 95° C. for about 30 minutes, and then cooling to room temperature. During this heating it is essential that the reaction mixture be protected from atmospheric moisture either by use of a drying agent on the exit of the vessel or by maintaining a moisture free atmosphere of a dry inert gas such as nitrogen. After the addition of the resin to the diisocyanate, a 25% solution of dry HCl in alcohol is added to prevent reaction of free isocyanate groups with active hydrogens in the resin. About 0.5 ml. of HCl-alcohol solution is used for each 100 grams of epoxy resin-castor oil resin used to make the prepolymer. When the arylene diisocyanate is very pure and contains little or no hydrolyzable chlorine, it is preferred to add the HCl solution to the isocyanate before the addition of the resin. This is due to the fact that with the pure diisocyanate the reaction is quite rapid and somewhat difficult to control.

Using the procedure described above, the following examples illustrate the preparation of the prepolymer:

Example 9

100 g. of the resin described in Example 5
100 g. (0.56 mol) of 2,4-toluene diisocyanate
(Mols diisocyanate per equivalent OH=1.9)

Example 10

100 g. of the resin of Example 5
82 g. (0.46 mol) 2,4-toluene diisocyanate
(Mols diisocyanate per equivalent OH=1.6)

Example 11

100 g. of the resin of Example 3
58 g. (0.33 mol) of 2,4-toluene diisocyanate
(Mols diisocyanate per equivalent OH=1.2)

Example 12

100 g. of the resin of Example 4
100 g. (0.56 mol) of 2,4-toluene diisocyanate
(Mols diisocyanate per equivalent OH=1.9)

Example 13

100 g. of the resin of Example 2
100 g. (0.56 mol) of 2,4-toluene diisocyanate
(Mols diisocyanate per equivalent OH=1.9)

Example 14

100 g. of the resin of Example 1
82 g. (0.46 mol) of 2,4-toluene diisocyanate
(Mols diisocyanate per equivalent OH=1.5)

Example 15

100 g. of the resin of Example 7
89 g. (0.5 mol) of 2,4-toluene diisocyanate
(Mols diisocyanate per equivalent OH=1.7)

Example 16

100 g. of the resin of Example 8
90 g. (0.5 mol) of 2,4-toluene diisocyanate
(Mols diisocyanate per equivalent OH=1.7)

PREPARATION OF FOAMED PLASTIC

Example 17

2 ml. (0.111 mol) of water and 1 ml. of diethylcyclohexylamine are added to 50 g. of the prepolymer of Example 10. The mixture is stirred thoroughly with a mechanical stirrer or paddle for about 20 to 30 seconds and quickly poured into a mold, 4 inches on a side which is lined with polyethylene as a mold release agent. After from 3 to 5 minutes standing at room temperature, the $CO_2$ evolved foams the plastic to maximum volume, which is about 60 cubic inches. (Mols of water used per theoretically free NCO groups remaining in prepolymer=0.63.)

The product obtained has small, uniform cell structure of 1 mm. average diameter or less. The surface of the block is a smooth, non-brittle skin. The foam is resilient and non-friable, having a density of 2.2 pounds per cubic foot, and showed no shrinkage on standing.

Example 18

The procedure is the same as Example 17 and the following ingredients are used: 2 ml. of water, 1 ml. of catalyst and 40 g. of the prepolymer of Example 12. (Mols of water used per theoretically free NCO groups remaining in prepolymer=0.65.) The resulting cellular product has an average cell size below 1 mm. and a density of 1.7 pounds per cubic foot.

Example 19

The procedure is the same as Example 17, and the following materials are used: 2 ml. of water, 1 ml. of catalyst and 40 g. of the prepolymer of Example 13. (Mols of water used per theoretically free NCO groups remaining in prepolymer=0.65.) The resulting foam has an average cell size below 1 mm. and a density of 1.7 pounds per cubic foot.

Example 20

The procedure is the same as Example 17 and the following materials are used: 2.5 ml. of water, 1 ml. of catalyst and 50 g. of the prepolymer of Example 9. (Mols of water used per theoretically free NCO groups remaining in prepolymer=0.66.) The resulting foam has an average cell size of 1 mm. and a density of 1.9 pounds per cubic foot. The foamed block showed less than 5% shrinkage.

Example 21

The procedure is the same as Example 17 and the following materials are used: 2 ml. of water, 1 ml. of catalyst and 40 g. of the prepolymer of Example 14. (Mols of water used per theoretically free NCO groups remaining in prepolymer=0.79.) The resulting foam has an average cell size of less than 1 mm. and a density of 1.8 pounds per cubic foot.

Example 22

The procedure of Example 17 and the following materials were used: 2 ml. of water, 0.5 ml. of triethylamine catalyst and 40 g. of the prepolymer of Example 11. (Mols of water used per theoretically free NCO groups remaining in prepolymer=1.11.) The resulting foam has an average cell size of less than 1 mm. and a density of 3.1 pounds per cubic foot. The foamed block showed less than 2% volume shrinkage.

Example 23

The procedure is essentially the same as Example 17, except that the additive is mixed in thoroughly with the prepolymer before adding the water and catalyst. The following materials are used: 2 g. of aluminum stearate, 2.5 ml. of water, 1 ml. of diethylcyclohexylamine catalyst and 40 g. of the prepolymer of Example 15. (Mols of water used per theoretically free NCO groups remaining in prepolymer=0.9.) The resulting foam has an average cell size below 1 mm. and a density of 1.9 pounds per cubic foot.

Example 24

The procedure is the same as Example 17 and the following materials are used: 2 ml. of water, 40 g. of the prepolymer of Example 16 and 1 ml. of diethylcyclohexylamine catalyst. The resulting foam has a cell size and density similar to the above examples.

Samples were cut from the foams prepared in the above examples and subjected to testing as described below.

TEST 1.—IMPACT

A 2 kg. weight is dropped through a guide tube a distance of 11 inches (bottom of weight to top of 1 inch cube sample) onto the foam sample under test. After impact, the height of the cube is measured.

TEST 2.—FLEXURAL

A sample of foam 3 x 1 x 1.5 inches is placed on supports two inches apart and a force gradually imposed upon the center of the sample. The amount of deflection occurring before the sample broke or cracked is determined. The maximum possible deflection is 1.375 inches, since the foam slips between the supports at this point.

TEST 3.—COMPRESSION-SET

This is a measure of resilience; the ability to be compressed and regain shape. One inch cube samples are used and are compressed to 50% and held for 18 hours. The height of the samples 24 hours after the compressive force is removed is noted.

TEST 4.—COMPRESSION-DEFLECTION

Samples one inch thick and having a circular cross section of 1 square inch are used. The force required to compress the samples 25% and 50% are observed.

RESULTS OF PHYSICAL TESTS

| Ex. No. | Test 1 Height of cube after Impact (Inches) | Test 2 Deflection | Test 3 Height of cube after Compression, inches | Test 4 Lbs./sq. in. compressed to— | |
|---|---|---|---|---|---|
| | | | | 25% | 50% |
| 17 | 1.0 | Maximum NBC | 0.69 | 5.4 | 8.3 |
| 18 | 1.0 | ----do---- | 0.81 | 2.9 | 4.5 |
| 19 | 0.375 | ----do---- | 0.81 | 2.3 | 3.4 |
| 20 | 0.375 | ----do---- | 0.75 | 4.4 | 5.9 |
| 21 | 0.375 | ----do---- | 0.75 | 1.7 | 2.4 |
| 22 | 0.938 | ----do---- | 0.81 | 3.9 | 6.0 |
| 23 | 1.0 | Maximum C | 0.75 | 1.9 | 3.2 |
| Foam A [1] | 0.938 (smashed) | 0.125 B | 0.56 | | |
| Foam B [1] | 0.375 | 0.25 B | 0.625 | | |

[1] Commercial products.
NBC=No break or crack on flexing.
C=Crack on flexing.
B=Break on flexing.

As illustrated by the above comparative tests, the products of this invention show excellent resilience, flexibility and resistance to impact.

These properties make these new cellular plastic materials of value wherever plastic foams are useful, and particularly for insulated fillings, coatings and the like.

It will be obvious from the above disclosure and Examples 17 to 24, inclusive, that the prepolymer would ordinarily be produced and sold to the ultimate consumer who would then combine it with water to effect the formation of the sponge. In other instances the preformed foam plastic would be produced and sold, from which shaped articles could be made.

I claim:

1. A process for producing cellular plastic material which comprises condensing from 0.025 to 0.5 mol of an epoxy resin, which is a reaction product of epichlorhydrin and bis-phenylolpropane, with 1 mol of castor oil in the presence of a condensation catalyst at temperatures of from 90° to 175° C., reacting the resulting condensation product with from 1.2 to 1.9 mols of an arylene diisocyanate per equivalent of hydroxyl group in said condensation product while protecting the reaction mixture from atmospheric moisture, and intimately incorporating in the resulting product from 0.5 to 1.5 mols of water per free isocyanate group theoretically remaining in said product.

2. A cellular plastic material obtained by the process of claim 5.

3. A cellular plastic material obtained by the process of claim 1.

4. A water-foamable composition comprising the reaction product of an epoxy resin-castor oil condensation product and an arylene diisocyanate, the said epoxy resin-castor oil condensation product containing from 0.025 to 0.5 mol of an epoxy resin which is a reaction product of epichlorhydrin and bis-phenylolpropane per mol of castor oil, and the amount of arylene diisocyanate reacted with the said condensation product being from 1.2 to 1.9 mols of diisocyanate per equivalent free hydroxy group in said epoxy resin-castor oil condensation product.

5. A process for producing cellular plastic material which comprises reacting an epoxy resin-castor oil condensation product in which the epoxy resin is a reaction product of epichlorhydrin and bis-phenylolpropane, said condensation product containing from 0.025 to 0.5 mol of epoxy resin per mol of castor oil, with from 1.2 to 1.9 mols of an arylene diisocyanate per hydroxyl group in said condensation product while protecting the reaction mixture from atmospheric moisture and reacting the resulting reaction product with from 0.5 to 1.5 mols of water per free isocyanate group theoretically remaining in said reaction product.

References Cited in the file of this patent
UNITED STATES PATENTS

| | | |
|---|---|---|
| 2,591,884 | Simon et al. | Apr. 8, 1952 |
| 2,594,979 | Nelson | Apr. 29, 1952 |
| 2,602,075 | Carpenter et al. | July 1, 1952 |
| 2,623,023 | Koroly | Dec. 23, 1952 |

OTHER REFERENCES

Chemical Engineering, April 1950, volume 57, No. 4, pages 165–166.